March 25, 1930.                D. R. DAVIS                1,751,622
LATERALLY STABLE AIR VEHICLE
Filed Feb. 18, 1928        2 Sheets-Sheet 1
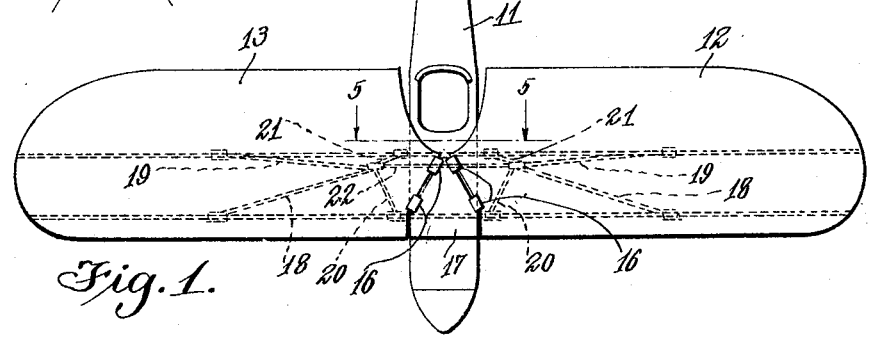
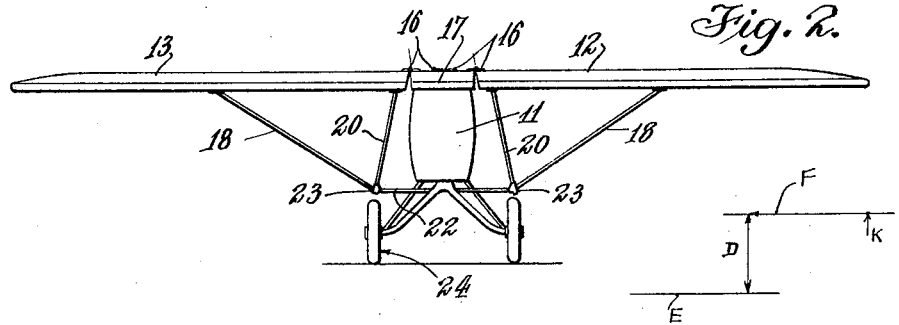
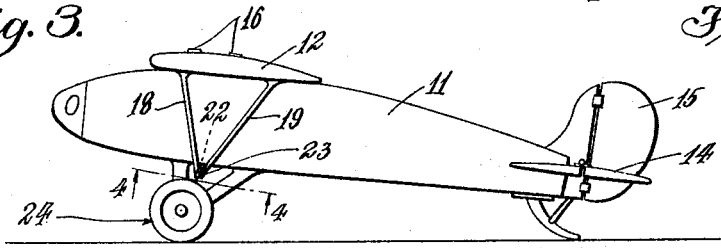
Inventor
David R. Davis
By Lyon & Lyon
Attorneys March 25, 1930.     D. R. DAVIS     1,751,622
LATERALLY STABLE AIR VEHICLE Filed Feb. 18, 1928     2 Sheets-Sheet 2

Inventor
David R. Davis
By Lyon & Lyon
Attorneys

Patented Mar. 25, 1930

1,751,622

UNITED STATES PATENT OFFICE

DAVID R. DAVIS, OF LOS ANGELES, CALIFORNIA

LATERALLY-STABLE AIR VEHICLE

Application filed February 18, 1928. Serial No. 255,289.

This invention relates to air vehicles of the type employing airfoils and one of the principal objects of the invention is to increase the safety of mechanical flight.

Another object is to effect lateral stability of air vehicles and, especially, aeroplanes.

Another object is to relieve the pilots of air vehicles of the necessity of operating so many controls, thus to decrease the strain upon them.

Another object is to insure smoother flying under adverse air conditions.

Another object is to provide a construction that will insure against the fuselage rolling or tilting laterally when the air pressure increases or diminishes beneath one of the wings as compared with that beneath the other wing.

Another object is to make it possible to steer the aeroplane to the right or left by operation of the rudder alone.

A very important object is to decrease the hazard of flying under conditions, as for example foggy weather, when the pilot of the aircraft is unable to compare his direction of flight with the direction in which the earth lies from him.

Other objects and advantages will appear in the subjoined detailed description.

The accompanying drawings illustrate the invention.

Figure 1 is a plan view of an air vehicle constructed in accordance with the provisions of this invention.

Figure 2 is a front elevation of Figure 1.

Figure 3 is a side elevation of Figure 2 from the left thereof.

Figure 4 is a diagrammatic plan view illustrating the hinge joints between the arms and the cross member, the view being taken from the line indicated by 4—4, Figure 3.

Figure 5 is a diagrammatic view illustrating the same hinge joints as in Figure 4, the view being taken from the line indicated by 5—5, Figure 1.

Figure 6 is a diagram indicating the hinges and the lever arm that receives the thrust of the compressive forces.

Figure 7 is a diagram indicating the center of gravity of the fuselage and the plane in which the wing pivots lie.

Figure 8:
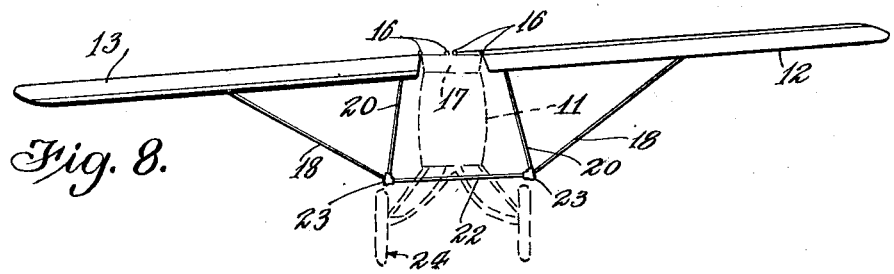
Figure 8 is an elevation similar to Figure 2 but with the wings tilted to different positions than in said Figure 2.

In the drawings the air vehicle is shown without a motor and propeller, since the invention is applicable to gliders and kites as well as to motorized aeroplanes, the advantages of the invention being the same in either case.

First referring to Figures 1 to 8 inclusive, for the form of invention there illustrated, a fuselage is indicated at 11 and wing airfoils at 12, 13. Details of construction of the airfoils 12, 13 are not entered into herein since the construction thereof is well understood by those versed in the art to which this invention relates. An elevator airfoil is indicated at 14 and a rudder airfoil at 15. The construction and operation of the airfoils 14, 15 are also well understood in this art and the controls therefore are not illustrated for that reason. However, it is to be understood that controls for the airfoils 14, 15 are provided and that they extend to within reach of the pilot.

Each of the airfoils 12, 13 is hingedly connected at 16 to the fuselage. In this description of the invention, the term fuselage applies to the body of the aeroplane even though said body includes a stationary wing stub or stubs. Such a wing stub is indicated at 17 and, preferably, has the same stream line form as the airfoils 12, 13 in so far as is practicable. In this instance, the actual hinging of the airfoils 12, 13 is between said airfoils and the stub 17 and, it is to be understood, that the wing stub 17 may be of greater width than shown, if that should prove desirable.

Each hinge joint extends at an angle forwardly and outwardly toward the leading edge of the associated wing airfoil so as to very effectively alter the pitch or angle of incidence of said airfoil according as the tip of said airfoil is swept upwardly or downwardly.

Means are provided for inter-connecting the airfoils 12, 13 and the connecting means are constructed so that when either airfoil 12, 13 sweeps upward or downward it produces downward or upward sweeping of the opposite airfoil. Thus, when the air pressures against the airfoils 12, 13 momentarily become unequal, for some reason or other, the air pressures will be almost immediately equalized by automatic or self-adjustment of said airfoils to angles at which both of said airfoils will be subjected to equal air pressures. The connections between the airfoils 12, 13, in this instance, are constructed as follows:

Connected with each airfoil 12, 13 is a set of arms, each set comprising downwardly and inwardly slanting arms 18, 19 and downwardly and outwardly slanting arms 20, 21. A cross member 22 is hingedly connected at its ends to the sets of arms, just described, by pivots 23. The arms 18, 19, 20, 21 of each set connect at their lower ends and, together with the associated wing, form a series of triangles which enclose a space of inverted pyramidal form, and the pivot 23 is positioned at the vertex thereof. To simplify the pivotal connection of the cross member 22 with the arms, it is preferable that the pivots or hinge pins 23 are positioned so that the prolonged axes of said pivots and lines that pass through the hinges 16 all intersect at a common point. In Figures 4 and 5 the prolonged axes of the pivots 23 are indicated at A, and the lines of the hinges 16 at B and they all intersect at C. Were the pivots 23 not positioned thus, it would be practically necessary to employ universal joints between the cross member 22 and the arms.

The wing hinges 16 constitute, in this instance, the only connections between the wings and the fuselage and it is to be particularly observed that said connections suspend the weight of the fuselage from points lying in a plane that is above the center of gravity of said fuselage so that, in flying, the fuselage is suspended pendulum-like from the wings and is thus free to remain in vertical position regardless of the angles the wings may assume under varying air pressures.

With the form of connections described above, for connecting the wings to the fuselage, I have found that, not only must the weight of the parts suspended from the wings be suspended from a point or points above the center of gravity of the fuselage, but, because the type of connections between the wings, namely the elements 18, 19, 20, 21, 22, the weight should be suspended from a point or points located in a plane that is no less than a given distance above the center of gravity, for the reason that the connections 18, 19, 20, 21, 22 are of such a nature as to impose an inward thrust or pressure of the wings upon the fuselage, the amount of said pressure depending not only upon the amount of the suspended weight but also upon the lengths of the arms 18, 19 relative to the lengths of the arms 20, 21. For example, if the arms 18, 19 are twice as long as the arms 20 and are connected to the centers of lift of the wings, half of the entire weight of the fuselage and the load carried thereby will be imposed on each wing joint. The minimum distance of the center of gravity of the suspended weight from the plane in which the thrust of the wings is imposed on the fuselage is found as follows: Referring, more particularly, to Figures 6 and 7, the distance D of the center of gravity E of the weight of the suspended load from the plane F in which the wing pivots or joints lie must be of sufficient magnitude so that the product of said distance D and the weight of the entire suspended load is greater than the product of the compressive forces at the wing roots or pivots and the maximum lever arm H that may exist between the points J where said compressive forces center. The magnitude of the lever arm H increases with the advance of the centers K of lift toward the leading edges of the wings because of the angular arrangement of the wing hinges.

It will be seen from the foregoing description of the connections between the means operably connecting the airfoils 12, 13 that, in this instance, said means are free from the fuselage 11, the cross member 22 being simply a floating member which may be positioned beneath the fuselage or at any other convenient location. It is to be understood that, while I have not illustrated any manually controlled mechanism for manual control of the wings, it may be desirable to provide such mechanism so that, upon occasion, the angles to which the wings may be adjusted are under control of the pilot. The necessity of illustrating such mechanism does not occur for the reason that such mechanism as is now employed for altering the angle of incidence of the ailerons on the present type of aeroplanes may be utilized. Such mechanism, be it understood, although it would actually connect the fuselage with the wings or with the connections 18, 19, 20, 21, 22, would not suspend any of the weight of the fuselage or its load from the wings. A landing gear is indicated at 24 and the type illustrated is suitable for alighting on and taking off of land. In event of the air vehicle being a seaplane, the well known pontoon construction may be substituted, as will readily be understood by those versed in this art.

The invention described above operates as follows:

Assuming, for example, that the air vehicle is in level flight, as in Figure 2, and that the air pressure should suddenly be increased beneath one of the airfoils 12, 13, as, for example, by a heavy gust of wind, the airfoil subjected to the wind gust, will be swept upwardly relative to the fuselage. For example, it may be assumed that this applies to the airfoil 12 and that the air gust sweeps it into the position shown in Figure 8. This movement of the airfoil 12 causes, through the connections 18 to 22 inclusive, the airfoil 13 to be swept downwardly to the position shown in Figure 8. The airfoil 13 will sweep downwardly until the air pressure therebeneath equals the pressure of the wind gust that caused upward sweeping of the airfoil 12. It is to be noted that, during this movement of the air-foils 12, 13, the fuselage 11 is suspended, pendulum like, and remains substantially in vertical position. Because of the automatic equalizing, in this manner, of the air pressures against airfoils 12, 13, the air vehicle will not roll sidewise in the air but will remain laterally stable and the fuselage will remain horizontal from side to side. As soon as the air pressures are equalized against the air-foils 12, 13, said airfoils will remain at the angles they assumed when the wind gust actuated them.

The form of the invention illustrated in Figures 9, 10 and 11 will now be described, the elements that function the same as those above described being indicated by the same reference characters with the addition of the letter "a".

The hinging of the airfoils $12^a$, $13^a$ is the same as above described, but the means that operably connect said airfoils is differently constructed, in this instance, and is as follows: Arms $18^a$, $19^a$ extend downwardly from each of the airfoils $12^a$, $13^a$ being pivoted or hinged at their upper ends 25 to said airfoils. The lower ends of the arms $18^a$, $19^a$ are pivoted or hinged at $23^a$ to a cross member $22^a$ which may be of any suitable construction. Preferably, the cross member $22^a$ is streamlined and may constitute an underwing airfoil, as illustrated, so as to make a biplane of the vehicle. In this instance, the airfoil $22^a$ is shorter than the combined lengths of the airfoils $12^a$, $13^a$ and is somewhat narrower in proportion.

At its central portion the member $22^a$ is pivotally connected to the fuselage $11^a$. It will be readily seen that the member $22^a$ constitutes a lever whose fulcrum 26 is on the fuselage. It is essential that the fulcrum 26 is above the center of gravity of the vehicle so that the fuselage will retain the pendulum-like action above described for the form of the invention illustrated in Figures 1 to 8 inclusive. The cross member $22^a$ is provided with an upwardly extending arm or arms 27 and the fulcrum 26 is positioned at the upper ends of said arms. The arms 27 connect at their upper ends and together constitute an inverted V-shaped member which may pass through a slot 28 that extends transversely of the fuselage, as clearly shown in Figure 9, said slot permitting of relative swinging between the arms 27 and fuselage. In this instance, the fulcrum point 26 is on the upper face of the wing stub $17^a$.

With the form of the invention just described, it will be readily understood that the distance of the fulcrum 26 above the center of gravity of the suspended load will be obtained in the same manner as hereinbefore described in connection with the form of invention illustrated in Figures 1 to 8 inclusive. However, if the arms $18^a$, $19^a$ be connected to the wings at their centers of lift, there will be no thrust of the wings on the fuselage at the roots or pivots of the wings and, accordingly, the fulcrum 26 may be positioned much nearer the center of gravity of the suspended weight than would be the case with the construction illustrated in Figures 1 to 8 inclusive. If, however, the arms $18^a$, $19^a$, be connected to the wings at other points than the centers of lift of said wings, there will be a thrust or a pull of the wings on the fuselage at the roots of the wings according as the connections are inwardly or outwardly of the centers of lift of the wings and this will be a factor in locating the fulcrum 26.

Figure 9:
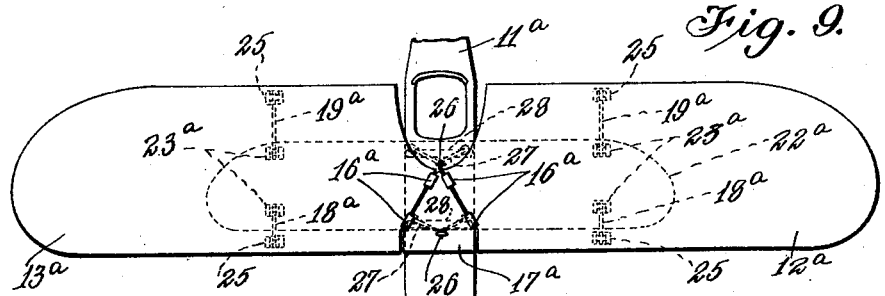
Figure 9 is a plan view of a different form of the invention than shown in the preceding figures, a portion of the fuselage being broken away to contract the view.
Figure 10:
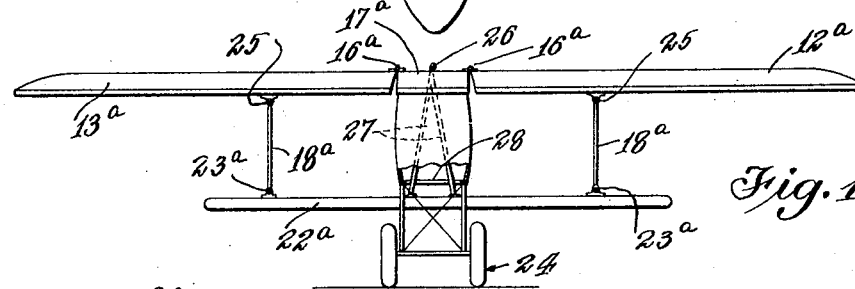
Figure 10 is a front elevation of Figure 9.
Figure 11:
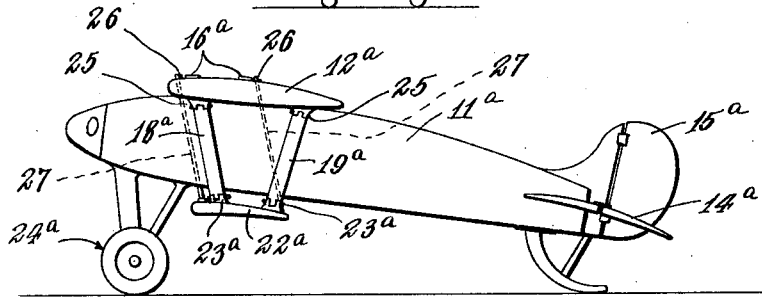
Figure 11 is a side elevation of Figure 10 from the right thereof.

The above description of the operation of the form of the invention illustrated in Figures 1 to 8 inclusive will essentially cover the operation of the form of the invention illustrated in Figures 9 to 11, and it will be readily understood that through the connections $18^a$, $22^a$ and 27 an upward or downward sweep of either airfoil $12^a$, $13^a$ will produce a corresponding downward or upward sweep of the other upper wing airfoil. At the same time the lower wing airfoil $22^a$ will tilt correspondingly.

It is to be understood that, in practice, the airfoils 12, 13, and $12^a$, $13^a$ will move very slightly relative to the fuselage, when unequal air pressures produce such movement, for the wing areas are comparatively large and, accordingly, a very slight tilting of the wings will produce a comparatively great change of air pressure against said wings. Thus, the tilting of the airfoils 12, 13 in Figure 6 is greatly exaggerated and is done purposely in order to make clear how the invention operates.

In flying with the ordinary aeroplane provided with stationary wing airfoils and with ailerlons, rolling or tilting from side to side is avoided by operating said ailerons. This changes the center of lift of the wings and tends to cause the aeroplane to nose upward or downward and necessitates operation of the elevator to retain fore and aft balance. Thus, a series of wind gusts causes the aeroplane to pitch fore and aft. This invention overcomes to a very large extent fore and aft pitching, since there are no ailerons to operate and it is not necessary to operate the elevator in order to properly control the vehicle when wind gusts strike it.

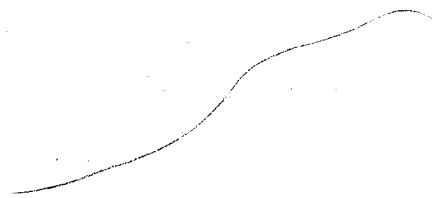

I claim:

1. A laterally stable air vehicle comprising a fuselage, airfoils hingedly jointed to the fuselage, each hinge joint extending at an angle outwardly toward the leading edge of the associated airfoil, and a means operable by movement of one of the airfoils in one direction to move the other airfoil in the opposite direction, the lines of the hinges intersecting at a point located approximately on a line connecting the centers of lift of the airfoils when in level flight.

2. A laterally stable air vehicle comprising a fuselage, airfoils hingedly jointed to the fuselage, the hinge joints extending aslant forwardly away from each other and being the sole connections between the fuselage and airfoils so that the center of gravity of the suspended weight is below all weight carrying connections of the fuselage with the airfoils, the product of said weight and the distance of the center of gravity of said weight from the plane in which the joints lie being greater than the product of the compressive forces at the joints and the maximum lever arm existing between the points where said compressive forces are concentrated.

Signed at Los Angeles, California, this 23rd day of January, 1928.

DAVID R. DAVIS.